United States Patent [19]

Yamamoto

[11] Patent Number: 4,934,014
[45] Date of Patent: Jun. 19, 1990

[54] WIPER DEVICE

[75] Inventor: Tokihiko Yamamoto, Kariya, Japan

[73] Assignee: Aisin Seiki Kabushiki Kaisha, Aichi, Japan

[21] Appl. No.: 276,393

[22] Filed: Nov. 25, 1988

[30] Foreign Application Priority Data

Nov. 26, 1987 [JP] Japan .................. 62-296036

[51] Int. Cl.$^5$ .................................................. A47L 1/00
[52] U.S. Cl. .............................. 15/250.13; 15/250.12; 15/250.17; 74/522
[58] Field of Search ........... 15/250.12, 250.13, 250.17; 74/522

[56] References Cited

U.S. PATENT DOCUMENTS

| 2,298,197 | 10/1942 | Coffey | 15/250.13 |
| 2,557,534 | 6/1951 | Cowles | 15/250.12 X |
| 2,728,244 | 12/1955 | O'Shei | 15/250.13 X |
| 2,881,462 | 4/1959 | O'Shei | 15/250.12 X |

FOREIGN PATENT DOCUMENTS

| 1906440 | 8/1970 | Fed. Rep. of Germany | 15/250.13 |
| 3208121 | 9/1983 | Fed. Rep. of Germany | 15/250.13 |
| 61-16154 | 1/1986 | Japan | 15/250.13 |
| 441182 | 10/1975 | U.S.S.R. | 15/250.13 |
| 516232 | 12/1937 | United Kingdom | 15/250.13 |

Primary Examiner—Frankie L. Stinson
Attorney, Agent, or Firm—Oblon, Spivak, McClelland, Maier & Neustadt

[57] ABSTRACT

A wiper device in which the swing angle of a blade set narrower or smaller during a high speed travel of a vehicle. Thus, in spite of a high speed travel of the vehicle, there is no fear that the upper limit of the blade exceeds a side edge of the vehicle window due to wind pressure on the blade.

11 Claims, 4 Drawing Sheets

WIPER DEVICE

BACKGROUND OF THE INVENTION

1. Field of the Invention

The present invention relates to a wiper device and in particular to a wiper device for wiping a vehicle window.

2. Description of the Related Art

Generally speaking, in a conventional wiper device, a blade made of elastic material such as synthetic resin is carried on an arm which is operatingly connected to a driving mechanism. Upon actuation of the driving mechanism, the arm is brought into angular reciprocating movement with the result that the blade is swung at an angle between a lower limit and an upper limit. Thus, a vehicle window is wiped.

However, since the blade is subject to effect of wind pressure during high speed travel of the vehicle, there is a fear that the upper limit of the blade exceeds a side edge of the vehicle window.

SUMMARY OF THE INVENTION

It is, therefore, a principal object of the present invention to provide wiper device without the aforementioned drawback.

Another object of the present invention is to provide a wiper device in which the swing angle of a blade is set smaller during a high speed travel of a vehicle.

To achieve the above objects, and in accordance with the purposes of the present invention, a wiper device for wiping a vehicle window is comprised of a stationary member mounted on a vehicle body, a shaft rotatably supported in the stationary member, an arm carrying a blade and connected to one end of the shaft, a swing member connected to the other end of the shaft, a driving mechanism for effecting angular reciprocating movement to the swing member, adjusting means for adjusting the connecting point between the swing member and the driving mechanism, and control means for actuating the adjusting means in light of the vehicle speed and an angular speed of the swing member.

BRIEF DESCRIPTION OF THE DRAWING

The above and other objects, features and advantages of the present invention will become apparent and more readily appreciated from the following detailed description of preferred examplary embodiments of the present invention, taken in connection with the accompanying drawing, in which.

DETAILED DESCRIPTION OF THE PREFERRED EMBODIMENT

Figure 1:
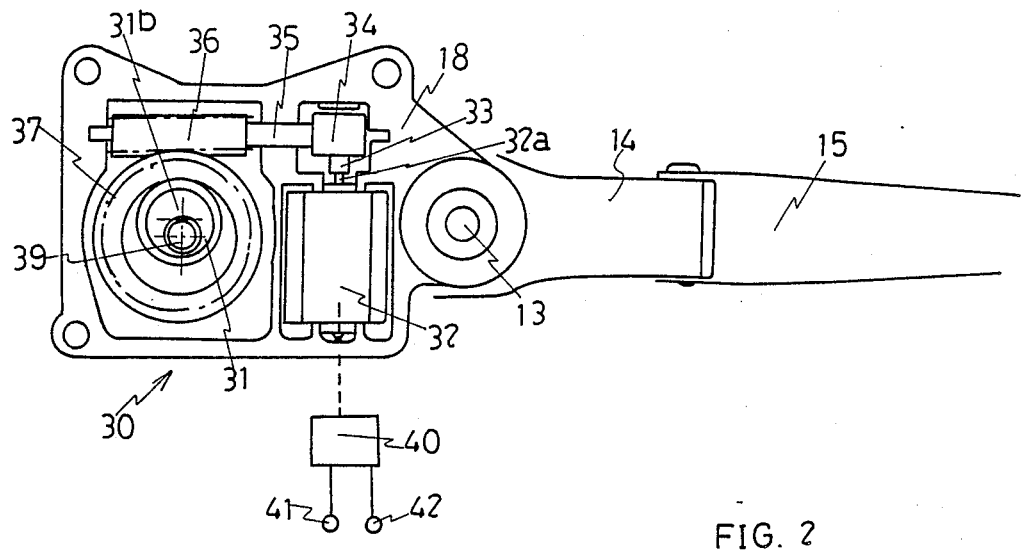
FIG. 1 is a front view of a wiper device.
Figure 2:
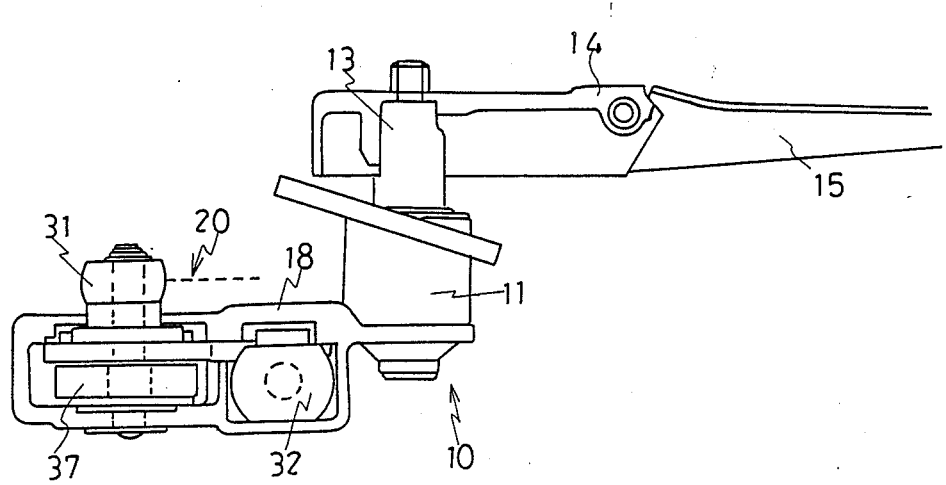
FIG. 2 is a plan view of a wiper device.
Figure 3:
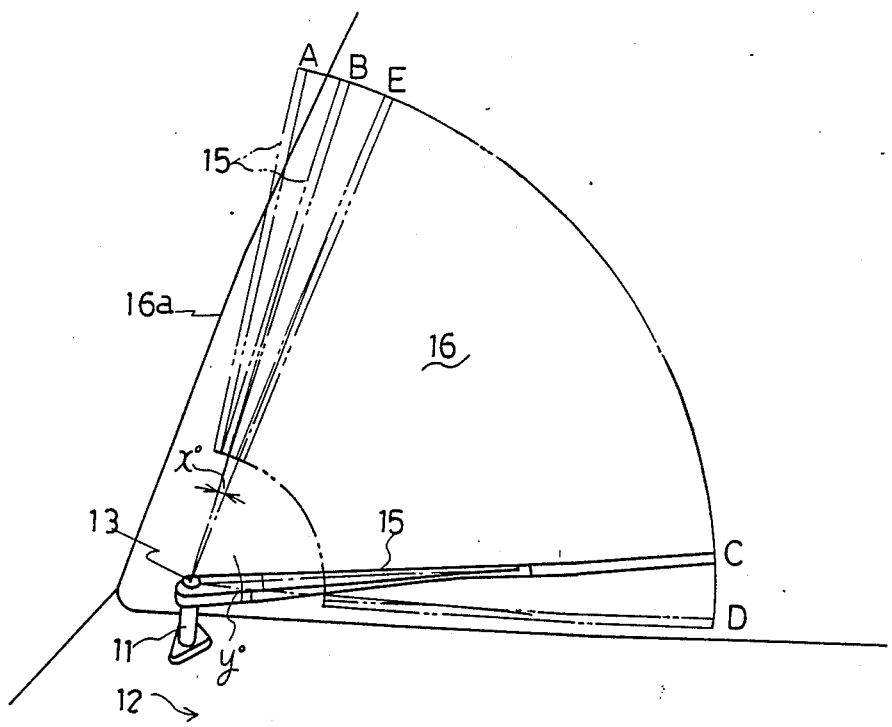
FIG. 3 is a view which shows an operation of a wiper device.

Referring now to FIG. 1 through 3, a wiper device 10 includes a stationary member 11 mounted on a vehicle body 12. A shaft 13 is rotatably supported in the stationary member 11. At one end of the shaft 13, there is fixedly connected an arm 14 which carries a blade 15 made of elastic material such as synthetic resin. The blade 15 is in sliding abutment on a vehicle window 16.

A swing member 18 is fixedly connected to the other end of the shaft 13 to which the angular reciprocating movement is effected from a driving mechanism 20. Upon actuation of the driving mechanism 20, the shaft 13 and the arm 14 are brought into swing movement with the result that a driver's side of the vehicle window 16 is wiped by the blade 15 which swings with the arm 14. An extent of the swing movement of the blade 15 in the circumferential direction about shaft 13 is hereinafter defined or referred to as a swing angle or wiping angle.

Figure 4:
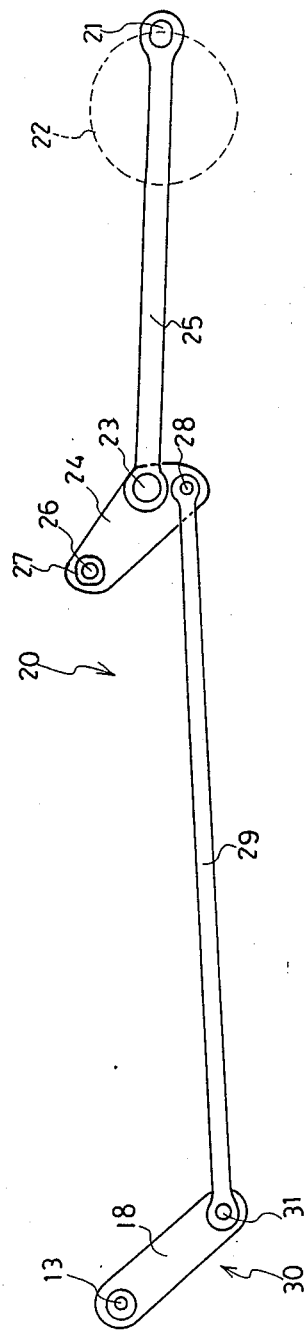
FIG. 4 is a view for illustrating a driving mechanism.
Figure 5:
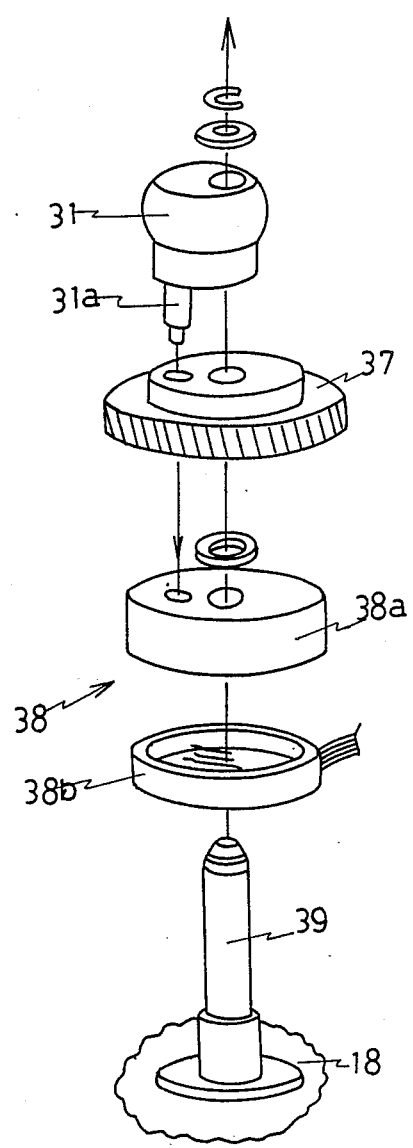
FIG. 5 is an exploded view of an adjusting means for adjusting a swing angle of a blade.

The driving mechanism 20, as apparent from FIG. 4, includes a pin 21 driven by a motor (not shown), which traces a locus in the form of a circle indicated by numeral 22. The pin 21 is operatingly connected to a pin 23 driven on a swing member 24 via rod 25. Since the rod 25 is brought into reciprocating movement upon operation of the motor, the swing member 24 is brought into swing movement about a shaft 26 which is fixedly connected to the swing member 24. The shaft 26 is rotatably supported in a stationary member 27 and is also connected to an arm (not shown) with a blade (not shown) for wiping a passenger's side of the window 16. On the swing member 24, a pin 28 is driven. Between the pin 28 and a ball-joint 31 which belongs to an adjusting means 30, a rod 29 is disposed. Due to swing movement of the swing member 24, the rod 29 is brought into reciprocating movement with the result that the swing member 18 is swung.

The adjusting means 30, which serves for adjusting the swing angle of the blade 15 by rotating, is provided on the swing member 18. In principle, the length between the axis of the shaft 13 and a connecting point to which the rod 29 is connected to the swing member 18 is varied by the adjusting means 30. In detail, the adjusting means 30 includes rotating means including a motor 32 with a rotational shaft 32a and fixedly mounted on the swing member 18 as well as and a worm-gear 33 fixedly mounted on the rotational shaft 32a. The worm-gear 33 is in mesh engagement with a worm-gear 34 which is fixedly mounted on a right end of a shaft 35. On a left end of a shaft 35, there is fixedly mounted a worm-gear 36 which is in mesh engagement with a gear 37. The gear 37, a ball-joint 31, and a sensor 38 having a first portion 38a are rotatably mounted on a common pin 39 which is fixedly connected to the swing member 18. A second stationary portion 38b of the sensor is non-rotatably mounted on the pin 39.

The ball-joint 31 has an eccentric projection 31a by which the ball-joint 31 may be rotated on the pin 39 together with the gear 26 and the first portion 38a of the sensor 38 upon rotation of the gear 26. The rotation of the ball-joint 31 about the pin 39 means that the connecting point 31b to which the rod 29 is connected to the swing member 31 is varied. This variation of the point results in the variation of the length between the point and the shaft 13. Thus, the resulting length-variation brings about a variation of the swing angle of the swing member 18 which is fixedly connected to the blade 15.

While the wiper device 10 is out of use, the blade 15 is positioned at an inoperating position D. Upon actuation of the wiper device 10, a controller 40 actutates the motor 32 for rotating the ball-joint 31 through an angle. Then, the blade 15 is transferred to a lower limit C after y degrees rotation. Thereafter, once the controller 40 begins to actuate the driving mechanism 20, the swing member 18 and the blade 15 are brought into angular reciprocating or swing movement between the lower limit C and a first upper limit E (or a second upper limit B) with the result that the driver's side of the window is wiped. If the angular velocity of the swing member 18 with the blade 15 is set at a low value while the vehicle is travelling at a high speed, the first upper limit E is selected. Under such situation, in spite of the strong effect of the wind pressure on the blade 15, the blade 15 is transferred at most near the second upper limit B and can not be transferred to an excess position A. Before selecting the first upper limit E or a second upper limit B, the adjusting means 30 is thus actuated so as to rotate the ball-joint 31 at an angle corresponding to the angular deviation of x degrees. The sensor 38 is used for checking whether the ball-joint 31 is rotated through the predetermined degrees by the relative rotation between portions 38a and 38b.

It is noted that the vehicle speed is detected by a speed sensor 41 which is connected to a speed meter (not shown). The angular velocity of the blade 15 is set a high or low value by manipulating a switch 42. The passenger's side of the window 16 is wiped in similar manner.

The relationship among the angular velocity of the blade 15, the vehicle speed and the swing angle is shown in the following table. The controller 40 is designed to comply with this relationship.

TABLE

| the angular velocity of the blade 15 | vehicle speed | the swing angle of the blade 15 |
|---|---|---|
| High | High | Narrow |
| Low | | |
| High | Low | Wide |
| Low | | |

As many apparently widely different embodiment of the present invention can be made without departing from the spirit and scope thereof, it is to be understood that the present invention is not limited to the specific embodiment thereof except as defining in the appended claims.

What is claimed is:

1. A wiper device for wiping a vehicle window, comprising:
    a stationary member mounted on a vehicle body;
    a shaft rotatably supported in said stationary member;
    an arm carrying a blade and connected to one end of said shaft;
    a swing member connected to the other end of said shaft;
    driving means for effecting angular reciprocating movement of said swing member;
    adjusting means for adjusting the position of a connecting point between said swing member and said driving means; and
    control means for controlling said adjusting means as a function of the vehicle speed and an angular speed of said swing member, whereby a swing angle of the blade may be adjusted.

2. A wiper device for wiping a vehicle window in accordance with claim 1 wherein said adjusting means includes a ball-joint eccentrically mounted relative to said swing member for adjusting the connecting point between said swing member and said driving means.

3. A wiper device according to claim 2 wherein said driving means is connected to said swing member via said ball-joint.

4. A wiper device for wiping a vehicle window in accordance with claim 2 wherein said ball-joint is eccentrically rotationally mounted to said swing member.

5. A wiper device for wiping a vehicle window in accordance with claim 4 including a motor for rotating said ball-joint.

6. A wiper device according to claim 5 including a rotation sensor means for sensing an angle of rotation of said ball-joint.

7. A wiper device for wiping a vehicle window in accordance with claim 1 wherein said blade is positioned at the driver's side of said vehicle window.

8. A wiper device for swinging a wiper connected to a shaft rotatably mounted to a vehicle body, comprising:
    a swing member fixed to said shaft,
    a pin fixed to said swing member;
    a ball-joint eccentrically rotatably mounted to said pin;
    driving means connected to said ball joint for swingingly driving said swing member about said shaft, whereby a connecting point between said swing member and said driving means varies with the rotation of said ball-joint; and
    means for rotating said ball-joint about said pin so as to adjust a position of said connecting point whereby a swing angle of the wiper may be adjusted.

9. A wiper device according to claim 8 including control means for controlling said means for rotating as a function of vehicle speed and the angular speed of said swing member.

10. A wiper device according to claim 9 wherein said means for rotating comprises:
    a gear rotatably connected to said ball-joint; and
    a motor-mounted to said swing member and having means for rotatably driving said gear.

11. A wiper device according to claim 10 including sensor means for sensing a rotational angular position of said ball-joint.

* * * * *